(12) United States Patent
Baert et al.

(10) Patent No.: US 8,631,622 B2
(45) Date of Patent: Jan. 21, 2014

(54) NON-SQUEAKING WOOD FLOORING SYSTEMS AND METHODS

(75) Inventors: Thomas L. M. Baert, Sint Martens Latem (BE); Chih-wen Tseng, JiaXing (CN)

(73) Assignee: Chinafloors Holding Limited (CN)

( * ) Notice: Subject to any disclaimer, the term of this patent is extended or adjusted under 35 U.S.C. 154(b) by 0 days.

(21) Appl. No.: 13/543,968

(22) Filed: Jul. 9, 2012

(65) Prior Publication Data

US 2013/0008118 A1 Jan. 10, 2013

Related U.S. Application Data

(60) Provisional application No. 61/505,170, filed on Jul. 7, 2011.

(51) Int. Cl.
*E04B 2/00* (2006.01)
*E04F 15/02* (2006.01)

(52) U.S. Cl.
CPC ..................................... *E04F 15/02* (2013.01)
USPC ......................................................... 52/582.1

(58) Field of Classification Search
USPC ...................... 52/578, 582.1, 591.5, 390, 391
See application file for complete search history.

(56) References Cited

U.S. PATENT DOCUMENTS

| | | | | |
|---|---|---|---|---|
| 4,841,652 A * | 6/1989 | Sakashita et al. | | 283/81 |
| 5,209,959 A * | 5/1993 | McNaul et al. | | 428/40.6 |
| 6,029,416 A * | 2/2000 | Andersson | | 52/592.1 |
| 6,691,480 B2 | 2/2004 | Garcia | | |
| 6,808,777 B2 * | 10/2004 | Andersson et al. | | 428/47 |
| 7,644,553 B2 * | 1/2010 | Knauseder | | 52/588.1 |
| 7,707,793 B2 * | 5/2010 | Moriau et al. | | 52/589.1 |
| 2008/0295438 A1 * | 12/2008 | Knauseder | | 52/589.1 |
| 2010/0092731 A1 | 4/2010 | Pervan et al. | | |
| 2010/0251658 A1 * | 10/2010 | Bouck | | 52/588.1 |

* cited by examiner

*Primary Examiner* — William Gilbert
*Assistant Examiner* — Kyle Walraed-Sullivan
(74) *Attorney, Agent, or Firm* — Gardner Groff Greenwald & Villanueva, PC

(57) ABSTRACT

Wood-based flooring systems with click-type interlocking joint systems include a protective film system covering the contact surfaces of the click system. The protective film system includes one or more sheets of a material with low moisture transmissivity and a low coefficient of friction. In this way, the contact surfaces of the click system are protected against undue humidity absorption and frictional rubbing to thereby avoid squeaking after installation. In some embodiments there are four film sheets covering the entirety of all four click surfaces, in others there is one film sheet covering the entirety of all four click surfaces, in others there is film covering the entirety of only the two longitudinal click surfaces, in others there is film covering the entirety of only the two tongue click surfaces, and in others there is film covering only the contact surfaces of the click surfaces.

19 Claims, 8 Drawing Sheets

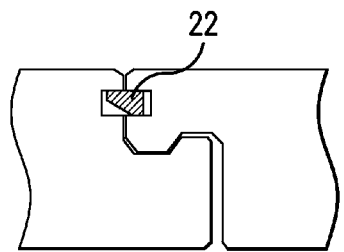
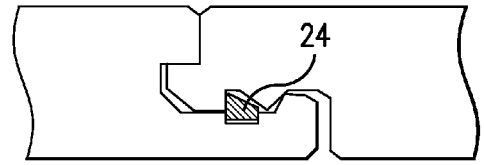
FIG. 4 (Prior Art)      FIG. 5 (Prior Art)
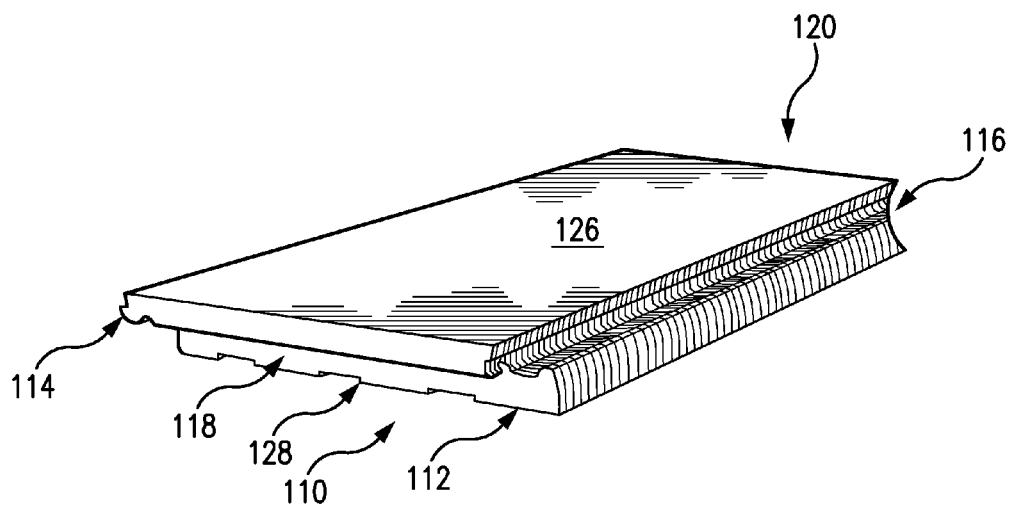
FIG. 6

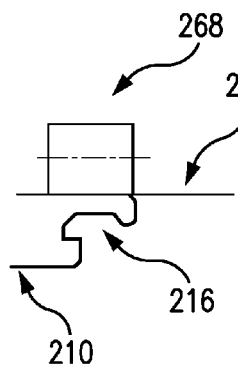 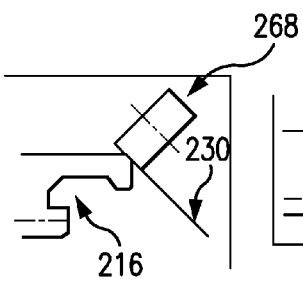 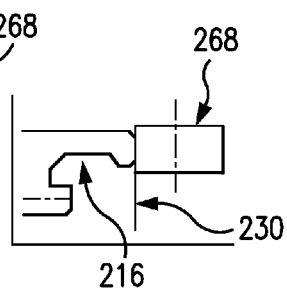 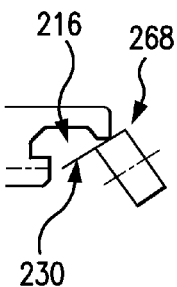
FIG. 24   FIG. 25   FIG. 26   FIG. 27
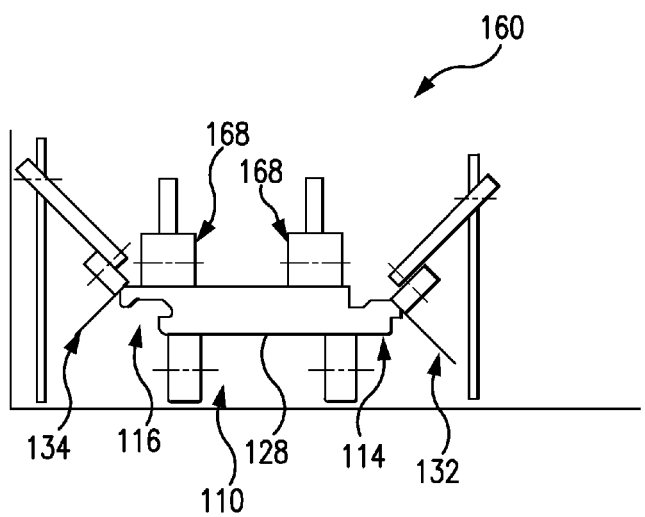
FIG. 28

NON-SQUEAKING WOOD FLOORING SYSTEMS AND METHODS

CROSS-REFERENCE TO RELATED APPLICATION

This application claims the priority benefit of U.S. Provisional Patent Application Ser. No. 61/505,170, filed Jul. 7, 2011, which is hereby incorporated herein by reference.

TECHNICAL FIELD

This invention relates generally to wood flooring systems, and more particularly to click-type interlocking joint systems of solid-wood flooring with anti-squeaking features.

BACKGROUND

Wood flooring systems are available in a variety of types and size. Methods of installation of these various wood flooring systems vary greatly, with some requiring complicated and slow nailing or gluing techniques in order to lay and connect adjacent floorboards. One common type of wood flooring system has an interlocking joint commonly called a tongue-and-groove system. Many of these tongue-and-groove flooring systems work well. But to properly install most tongue-and-groove floors, it's often necessary to hire a contractor or other professional, which increases the total cost for the consumer and can delay the installation. It is generally preferred that flooring installations be simple enough to be done by the consumer without hiring a professional installer. Some tongue-and-groove wood flooring systems can be installed "floated," meaning that their installation does not required complicated nailing or gluing, so that they can be easily installed by consumers without hiring professional installers. Floated installation is possible due to the design of the tongue-and-groove interlocking joint system. Interlocking tongue-and-groove joint systems that enable floated installations of wood flooring are commonly called "click systems."

It is generally understood that "click system" refers to an interlocking joint system including two tongues and two grooves formed on four sides (edges) of a floorboard. And it's generally the case that floorboard long-side (longitudinal side) interlocking tongues/grooves and floorboard cross-side (butt-end side) interlocking tongues/grooves may have different shapes. Conventional click systems are designed to lock adjacent floorboards in position horizontally and vertically to prevent the adjacent floorboards from separating from each other horizontally and/or vertically after installation without any glue or nails. In addition, conventional click systems can be easily unlocked, which enables the user to uninstall the flooring and then reinstall it at different location. Conventional click systems have various forms/types including but not limited to snap-lock systems, rotatable-lock systems, drop-lock systems, etc., any of which typically can be provided with or without separate locking elements.

FIGS. 1-3 show one common prior-art solid-wood floorboard 10 with a click-type interlocking joint system 12. The floorboard 10 includes two tongues and two grooves formed on its four sides. A longitudinal-side tongue 14 is formed along one longitudinal side of the floorboard 10 and a longitudinal-side groove 16 is formed along the opposite longitudinal side of the floorboard, with the longitudinal-side tongue and groove sized and shaped to receive the longitudinal-side groove and tongue, respectively, of adjacently installed floorboards. And a butt-side tongue 18 is formed along one butt-end side of the floorboard 10 and a butt-side groove 20 is formed along the opposite butt-end side of the floorboard, with the butt-side tongue and groove sized and shaped to receive the butt-side groove and tongue, respectively, of adjacently installed floorboards.

Click systems are commonly used for laminate and engineered-wood flooring systems. Engineered flooring is typically made of a top layer and a core (or substrate). The top layer is typically a hardwood veneer and the core is typically plywood made of a softwood species such as but not limited to pine, spruce, poplar, birch, eucalyptus, etc. The core is typically made of several layers with crossed-direction fibers arranged to increase the stability of the floorboard.

Click systems are rarely used for solid-wood flooring. In solid-wood flooring systems, each individual floorboard is made of only one piece of wood, of a top layer and a butcher-block construction base, or of only a butcher-block construction. Click systems are rarely used for solid-wood flooring because after installation they are typically not stable enough and so the floor makes noises and squeaks when it's walked on. Squeaking is caused by two contacting wood surfaces sliding against each other, with the friction of the surfaces creating the noise. In general, surfaces with relatively low coefficients-of-friction can slide against each other more easily and not create noise. When a person walks on a solid-wood floor, the floorboards move up and down slightly when stepped on. The slight vertical movement of the floorboards creates friction at the point of contact between floorboards, and when this friction is too great it will create a squeaking noise.

Solid wood floorings are generally not stable enough to avoid squeaking because they're easily affected by variations in climate, especially the room air humidity and temperature. Wood is a hygroscopic material, meaning that wood material naturally interacts with the surrounding climate. If the climate is dry, then the wood material will tend to dry and in consequence to shrink. And if the climate is wet, then the wood material will tend to be absorb moisture and in consequence to expand. The consequences of this shrinking and/or expanding are a distortion (e.g., cupping, bending, and/or springing) of the shape and size of the floorboards and the interlocking joint system interconnecting them.

For solid-wood floorboards with a click system, this expansion and shrinkage make the floorboards difficult if not almost impossible to install such that they do not squeak. Plus, the resulting gaps or spaces between installed floorboards are a visual/aesthetic detraction. Such expansion and shrinkage is not such an issue for engineered or laminate flooring systems, as the fibers of the core are cross-directed, so the floorboard and the interlocking joint system are only negligibly at most affected by these climate variations.

Shrinking and expansion are generally proportional to the width and thickness of the floorboards. Wide floorboards generally experience more distortion than narrow floorboards. This tends to limit the width of solid-wood flooring to narrow sizes, generally less than about 90mm wide. Thick floorboards generally experience less distortion than thin floorboards. A known solution to increase the stability of solid-wood floorboards is to increase their thickness, but this added material significantly increases the cost of the flooring system.

Accordingly, a disadvantage of solid-wood flooring systems with click systems is that they are subject to shrinkage and/or expansion that causes distortion of the floorboards sufficient to result in squeaking when walking on the floor. Such squeaking can be so severe that it can lead some users to completely replace the floor, which is very expensive to do.

The bigger the climate variation, the bigger the distortions of the floorboard and thus the bigger the potential for squeaking. In addition, other disadvantages of solid-wood flooring systems with click systems is that the floorboards typically have visually unpleasing gaps after installation, can be difficult to install, and are limited to narrow widths.

It is known that hygroscopic distortions and the resulting squeaking can be reduced by the application of a layer of wax on the contacting surfaces of the interlocking joint system. The wax has two purposes. The first is to seal the surface of the interlocking joint system to create a moisture barrier to reduce shrinkage and/or expansion of the floorboards. The second is to create a layer with a low coefficient of friction on the contacting surfaces of the interlocking joint system in order to reduce friction and thus squeaking.

But such wax systems and methods have several disadvantages. One common problem is that the wax is difficult to apply so that it fully seals the contacting surfaces of the interlocking joint system, so the floorboard is still affected by climate change and subject to frictional squeaking. Typically, the wax is sprayed onto the contacting surfaces and then dried with heat. The wax material is spray-applied in the liquid state, so it tends to penetrate into the wood pores (grain), and this affects the quality and consistency of the seal.

The wax penetration and sufficiency of the sealing of the contacting surfaces depends on the wax-material quantity, quality, viscosity, and temperature, as well as the application climate (e.g., temperature and humidity) and the wood species and density. With respect to the wax quantity, if too little is used such that too much of the wax penetrates into the wood pores, the contacting surface will not be sufficiently covered (thickness and coverage area) and squeaking will still occur. To make sure the contacting surfaces are covered by wax with a sufficient thickness and coverage area, no matter the penetration rate, the quantity of wax applied can be increased, but this greatly increases the cost.

With respect to the wax quality, even the highest-quality wax can degrade over time. After a long period of use, for example a few years, the wax tends to become drier and harder. Sometimes, it will crack and peel off, thereby leaving the contacting surfaces unprotected. This will affect the ability of the wax to protect the floorboard against humidity, with the result that the floor might start squeaking. In addition, wax quality is affected by temperature and humidity, and so the wax quality changes from winter to summer. This is the reason why many wood flooring systems with click systems, even those with wax, squeak during only one season of the year and not during the other seasons.

And with respect to the wood species and density, even within the same species, wood characteristics can be very different. For example, white oak from Europe has rather wide annual growth-ring circles with big pores, while white oak from Russia has rather narrow annual growth-ring circles with smaller pores. These differences affect the wax penetration and resulting surface sealing.

The result is that these numerous parameters affecting the penetration of the wax make the seal quality inconsistent and unreliable. As a consequence, often the flooring will squeak, if not in most places, then at least at a few localized places.

It is also known that some conventional click systems include separate metal clips in connection with rubber parts in order to avoid contact between the wood surfaces. For example, such click systems can be provided by drop-lock systems (with or without separate locking elements 22) as shown in FIG. 4, snap-lock systems (with or without separate locking elements 24) as shown in FIG. 5, rotatable lock systems (with or without a separate locking element) (not shown), and other click systems with or without separate locking elements. Such click systems and methods have several disadvantages. One is that contact points between surfaces of adjacent wood floorboards remain, and so squeaking might still occur when those surfaces rub against each other. Another is that such systems and methods do not provide moisture protection, so the floorboard size and shape are distorted by humidity and temperature variations.

Accordingly, it can be seen that there exists a need for improvements in click-type interlocking joint systems for solid-wood flooring systems. In particular, there exists a need for solid-wood flooring with a click system providing for minimized/eliminated squeaking and wider floorboards all manufacturable by cost-effective production methods. It is to the provision of solutions to this and other problems that the present invention is primarily directed.

SUMMARY

Generally described, the present invention relates to systems and methods of protecting wood-based (e.g., solid-wood) flooring systems with click-type interlocking (tongue-and-groove) joint systems against undue humidity absorption and frictional rubbing to thereby avoid squeaking after installation. One aspect of the present invention is the provision of a moisture-barrier film that prevents wood floorboards from being distorted by humidity and temperature variations due to the natural hygroscopic character of the wood material. Another aspect of the invention is the provision of a low-friction film interposed between the contact surfaces of the floorboards to avoid squeaking of the floorboards when they rub against each other. Preferably, but not necessarily, the moisture-barrier and low-friction features are combined into a single protective film provided for example by one or more flexible plastic sheets of material.

Unlike conventional wax systems, the protective film completely covers all of the contacting surfaces of the click system, regardless of the wood species, the wood origin, or the quantity of material applied. The protective film is not affected by temperature and humidity change, so the film system is effective all year long. In this way, the present invention provides a more reliable solution, relative to common wax, to the problem of moisture variations and the resulting squeaking noises, and is suitable for all types of wood species. Furthermore, because of the low coefficient of friction of the protective film on the click surfaces, the floorboards more easily slide together and their click surfaces more easily click together to interlock adjacent floorboards, thereby making the solid-wood flooring system easier to install. Moreover, the floorboards with the protective film on their click surfaces can be installed in a floated installation, and in embodiments with significant exposed portions of the bottom major faces of the floorboards they can be installed in a glued installation for example over under-floor heating systems.

Accordingly, the various aspects of the present invention at long-last provide an effective, durable, and cost-effective solution to the problem of squeaking of solid-wood flooring with click systems.

The specific techniques and structures employed to improve over the drawbacks of the prior systems and methods, and to accomplish the advantages described herein, will become apparent from the following detailed description of example embodiments and the appended drawings and claims.

BRIEF DESCRIPTION OF THE DRAWING FIGURES

FIG. 4 is a longitudinal cross-section view of portions of two prior-art floorboards of another conventional wood flooring system with a conventional click-type interlocking joint system including one type of separate locking elements.

FIG. 5 is a lateral cross-section view of portions of two prior-art floorboards of yet another conventional wood flooring system with a conventional click-type interlocking joint system including another type of separate locking elements.

FIG. 6 is a top perspective view of a click-type, solid-wood floorboard of a flooring system with a film protection system according to a first example embodiment of the present invention, with the film system removed for clarity of illustration.

Figure 11:
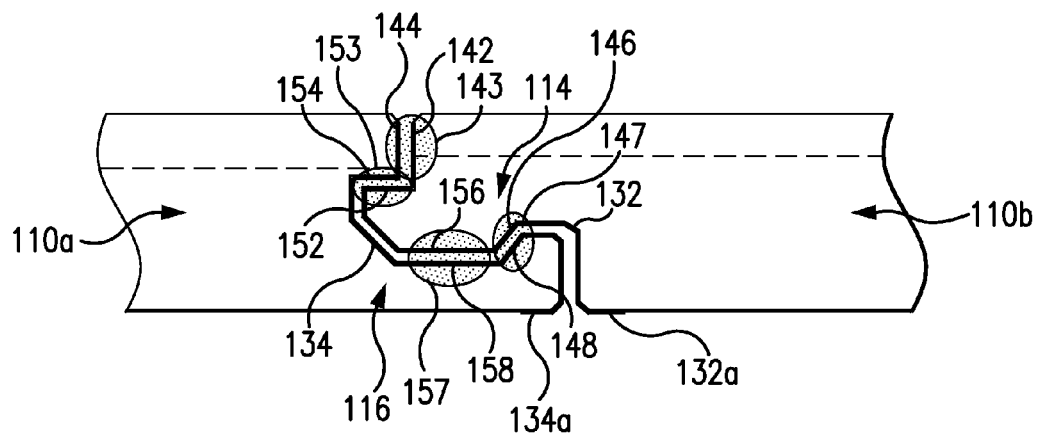

FIG. 11 a lateral cross-section view of portions of an interlocking longitudinal tongue and groove joint of two adjacent and abreast floorboards of the flooring system of FIG. 6, showing protective film strips covering the longitudinal click contact surfaces.

Figure 11A:
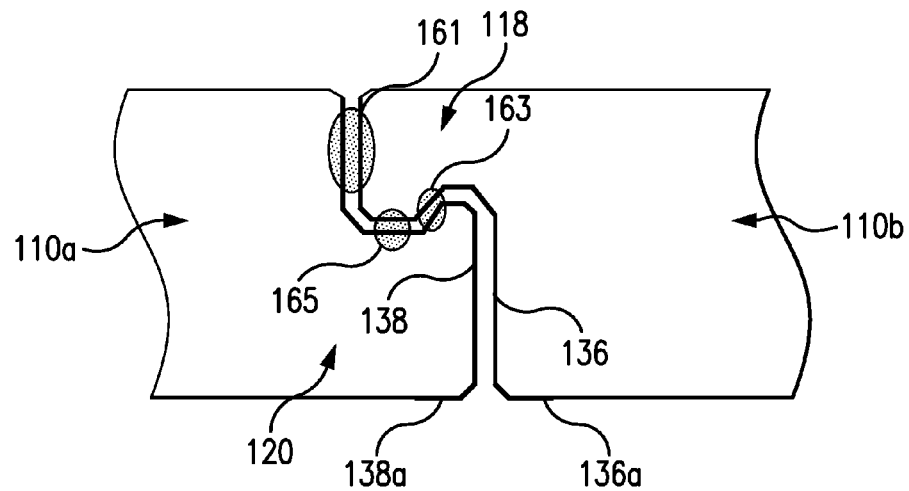

FIG. 11A a longitudinal cross-section view of portions of an interlocking longitudinal tongue and groove joint of two adjacent and abutting floorboards of the flooring system of FIG. 6, showing protective film strips covering the butt click contact surfaces.

Figure 12:
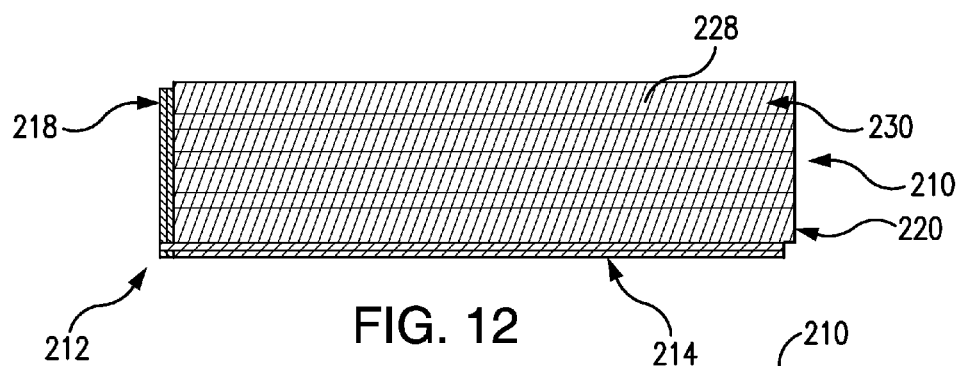

FIG. 12 is a bottom view of a click-type, solid-wood floorboard of a flooring system with a film protection system according to a second example embodiment of the present invention, showing the film system covering the click contact surfaces.

Figure 13:
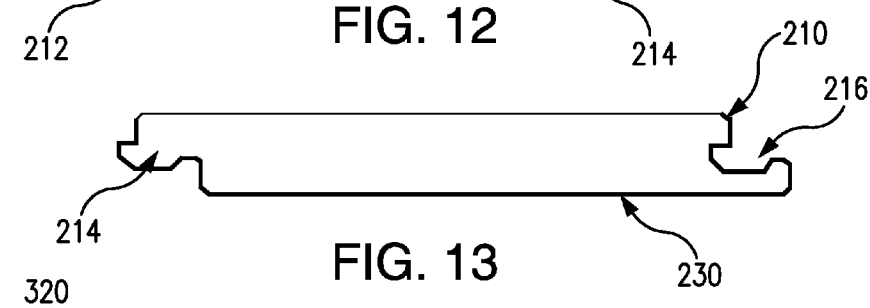

FIG. 13 is a lateral cross-section view of the floorboard of FIG. 12.

Figure 14:
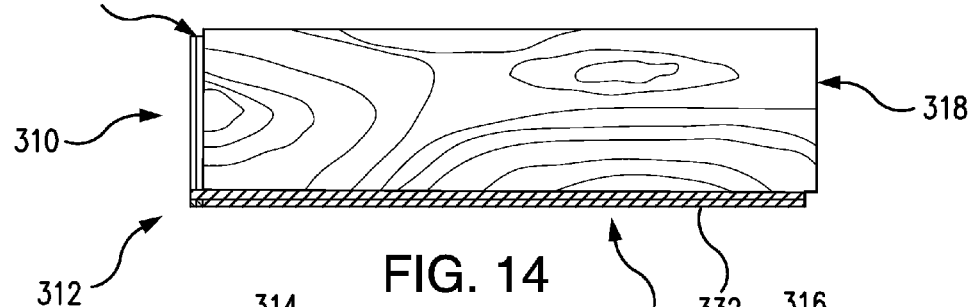

FIG. 14 is a top view of a click-type, solid-wood floorboard of a flooring system with a film protection system according to a third example embodiment of the present invention, showing the film system covering the click contact surfaces.

Figure 15:
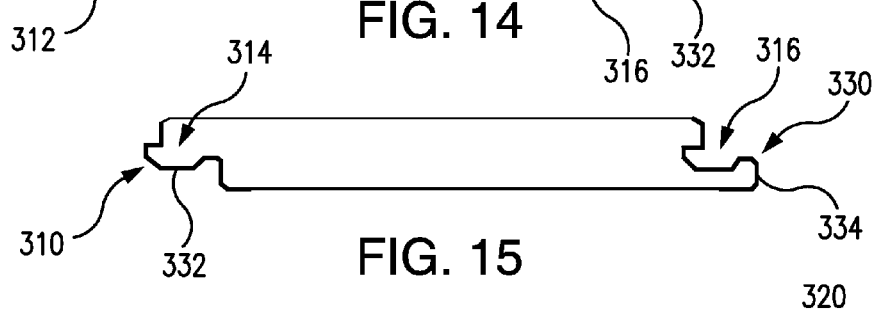

FIG. 15 is a lateral cross-section view of the floorboard of FIG. 14.

Figure 16:
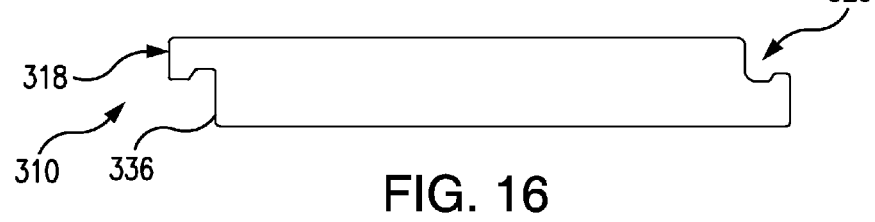

FIG. 16 is a longitudinal cross-section view of the floorboard of FIG. 14.

Figure 17:
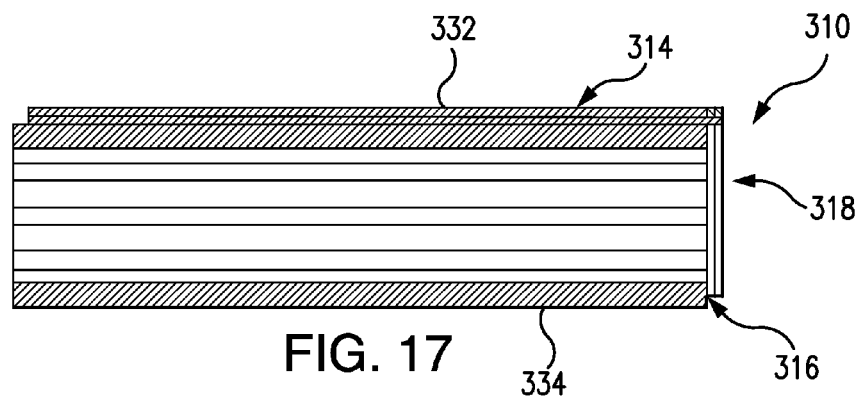

FIG. 17 is a bottom view of the floorboard of FIG. 14.

Figure 18:
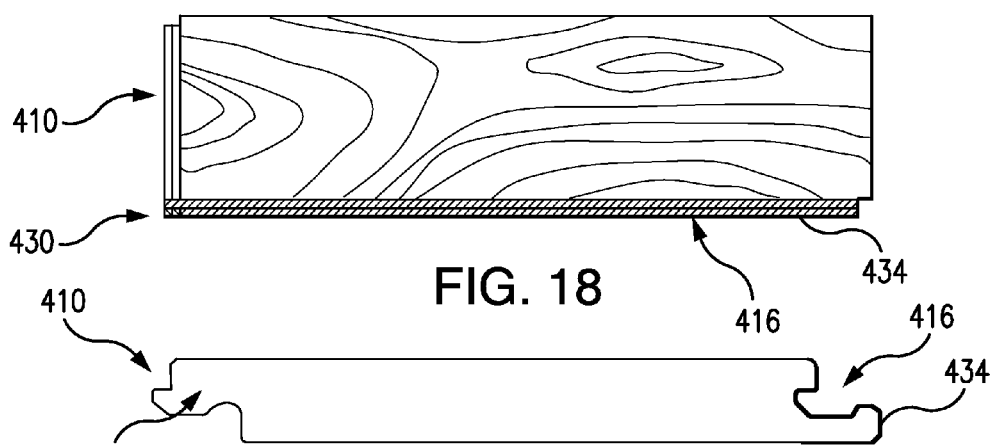

FIG. 18 is a top view of a click-type, solid-wood floorboard of a flooring system with a film protection system according to a fourth example embodiment of the present invention, showing the film system covering the click contact surfaces.

Figure 19:

FIG. 19 is a lateral cross-section view of the floorboard of FIG. 18.

Figure 20:
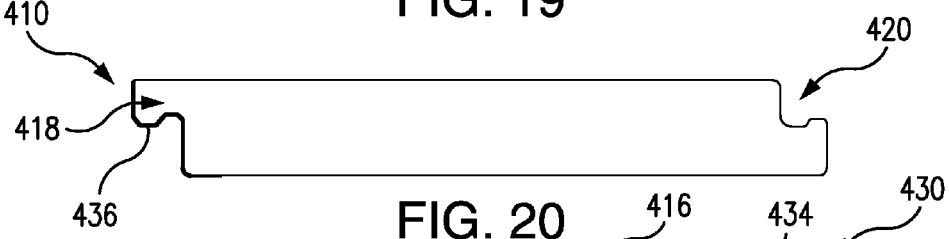

FIG. 20 is a longitudinal cross-section view of the floorboard of FIG. 18.

Figure 21:
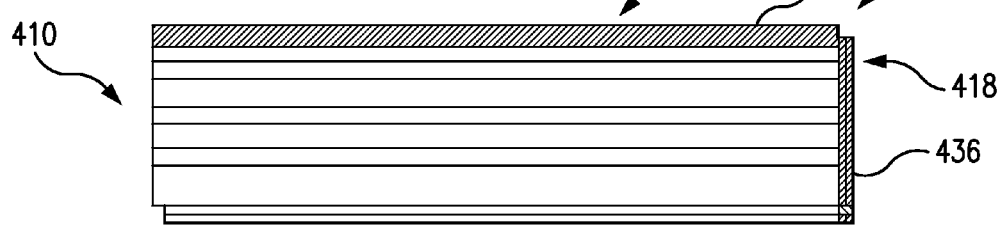

FIG. 21 is a bottom view of the floorboard of FIG. 18.

Figure 22:
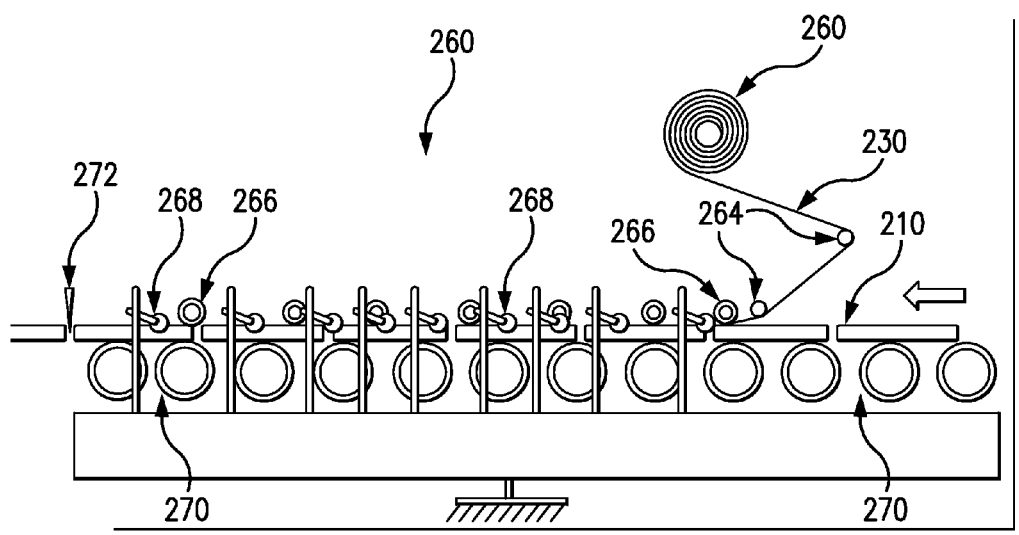

FIG. 22 is a side view of an example profile-wrapping machine used to apply the film of FIGS. 12-13 onto the longitudinal click system contact surfaces.

Figure 23:
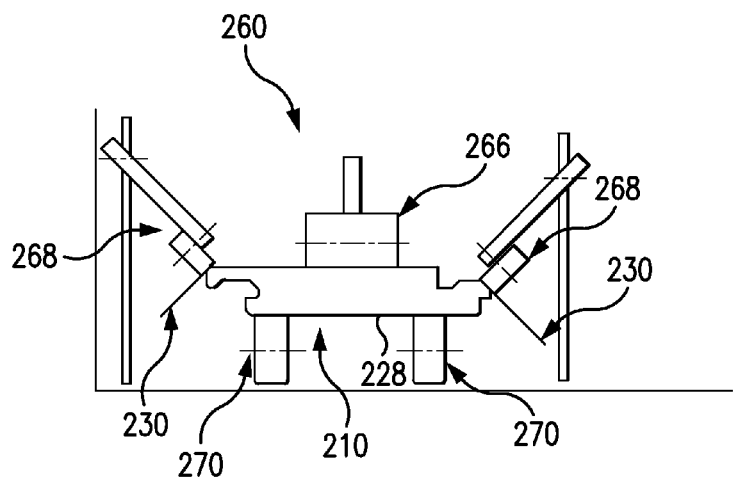

FIG. 23 is a front view of the profile-wrapping machine of FIG. 22 in use.

FIGS. 24-27 are side detail views of the profile-wrapping machine of FIG. 22 in use forming the protective film onto one of the longitudinal contact surfaces of the click system.

FIG. 28 is a front view of another example profile-wrapping machine used to apply the film of FIGS. 6-11 onto longitudinal contact surfaces of the click system.

DETAILED DESCRIPTION OF EXAMPLE EMBODIMENTS

The present invention relates to systems and methods of protecting solid-wood flooring systems with click-type interlocking joint systems against undue humidity absorption and frictional rubbing to thereby avoid squeaking after installation. In various aspects, the invention includes floorboards having protective film systems covering their contacting click system surfaces, protective film systems for applying to the contacting click system surfaces of floorboards, and methods and machines for applying the film to the click systems of the floorboards. The protective film systems significantly reduce moisture intrusion/escape and frictional rubbing of the floorboards to thereby minimize/eliminate squeaking after installation to produce a non-squeaking floor system.

As used herein, the term "floorboards" includes flooring panels, planks, tiles, and other similar plate-like wood-based structures. And the term "non-squeaking" means completely or at least substantially non-squeaking, that is, in rare instances the floorboards including the protective film systems might possibly squeak on occasion, but any such instances of squeaking are isolated and negligible relative to conventional wood flooring systems.

Turning now to the drawings, FIGS. 6-11 show a solid-wood floorboard 110 of a solid-wood flooring system including a plurality of the floorboards according to a first example embodiment of the present invention. Each of the floorboards 110 has a click-type tongue-and-groove interlocking joint system 112 and a protective film system 130 for the click system. The floorboard 110 and its click system 112 are shown alone in FIG. 6, without its protective film system 130, for clarity of illustration.

The floorboards 110 are typically between about 0.25 inch and about 1.0 inch in thickness, though in other embodiments they have a greater or smaller thickness. The width of each floorboard 110 is typically between about 2.0 inches and about 10.0 inches, though in other embodiments they have a greater or smaller width. And the length of each floorboard 110 is typically between about 1.0 foot and about 8.0 feet, though in other embodiments they can have a greater or smaller length. The protective film systems 130 are ideally suited for being applied to contacting surfaces of click-type interlocking joint systems 112 of solid-wood floorboards 110. This includes floorboards 110 made of only one piece of wood, of a top layer and a butcher-block construction, and of a butcher-block construction alone, regardless of the wood species used (though hardwoods are typically preferred). Alternatively, the protective film systems 130 can be used on click-type interlocking joint systems 112 of laminate and engineered-wood floorboards, of other types of floorboards, and of other types of interconnecting wood-based board systems. As such, the floorboards 110 with the protective film systems 130 are typically installed "floated," though alternatively they can be attached to most any type of subfloor, such as concrete, wood, plywood, MDF or HDF fiberboards, or oriented strand board ("OSB"), by traditional fasteners such as nails, staples or glue.

As mentioned above, each of the floorboards 110 has a click-type tongue-and-groove interlocking joint system 112. Thus, each floorboard 110 includes two tongues 114 and 118 and two grooves 116 and 120 formed on its four sides (edges) and defining its click system 112. In particular, a longitudinal-side tongue 114 is formed along one longitudinal side of the floorboard 110 and a longitudinal-side groove 116 is formed along the opposite longitudinal side of the floorboard. The longitudinal-side tongue 114 and groove 116 are sized and shaped to receive the longitudinal-side groove and tongue, respectively, of adjacent and abreast installed floorboards 110 to interlock them together when installed. And a butt-side tongue 118 is formed along one butt-end side of the floorboard 110 and a butt-side groove 120 is formed along the opposite butt-end side of the floorboard. The butt-side tongue 118 and groove 120 are sized and shaped to receive the butt-side groove and tongue, respectively, of adjacent and abutting installed floorboards 110 to interlock them together when installed.

Typically, the tongues 114 and 118 and the grooves 116 and 120 are formed along the entire lengths and widths of the longitudinal and butt-end sides of the floorboard 110, respectively, except at the intersections of the tongues and the grove at the four corner of the floorboards, as depicted. And the tongues 114 and 118 and the grooves 116 and 120 extend between and connect first and second opposite flat major faces, with the first major face typically being a top exposed surface 126 of the floorboard 110 and the second major face typically being a bottom (back) concealed surface 128. The tongues 114 and 118 and the grooves 116 and 120 are typically cut into the raw boards in a conventional milling process. In addition, the protective film systems 130 can be applied to various other types of click-type interlocking joint systems 112. This includes for example other snap-lock systems, rotatable-lock systems, and drop-lock systems, with or without separate locking elements, as well as all other click systems known in the art.

As mentioned above, each of the floorboards 110 has a protective film system 130 for its click system 112. The protective film system 130 includes at least one sheet of a film that entirely covers at least one contact surface of at least one tongue or groove of the click system 112. The film 130 is shown in the drawings as a thick line in profile views and indicated by diagonal lines in plan views.

The film is made of a material having moisture-barrier and low-friction properties. Thus, the material used for the film has a low coefficient of friction such that it eliminates, or at least substantially minimizes to a negligible level, any frictional squeaking when the click surfaces 112 of two adjacent interlocked floorboards 110 slide/rub against each other. The film material has dry coefficient of friction that is lower than about 0.1. For example, the dry coefficient of friction is preferably about 0.01 to about 0.5, more preferably about 0.01 to about 0.1, and most preferably about 0.01 to about 0.05. In this way, even if one or two adjacent floorboards 110 distort, if they then rub against each other they will make substantially no (i.e., negligible at most) squeaking noises. In addition, the material used for the film is preferably non-porous, with a low moisture transmissivity such that it completely or at least substantially blocks moisture/humidity from penetrating into, or escaping out of, the floorboard 110 through the contact surfaces of the click system 112. For example, the material used for the film has a vapor transmission of preferably greater than about 10 m, more preferably about 18 m to about 25 m, and most preferably about 18 m to about 19 m. And the material used for the film has a water absorption of preferably about 0.01% to about 1.5%, more preferably about 0.01% to about 0.3%, and most preferably about 0.01% to about 0.1%.

In a typical commercial embodiment, for example, the material is a orientated polypropylene (OPP) film with one side (the inner/back side facing and adhering to the respective contact surface) covered by an adhesive. The OOP film is typically transparent (though it need not be) and the adhesive is typically acrylic (though other adhesives can be used). Tests have shown that heat-treating the OPP film results in an increased quality in terms of low friction. Alternatively, the film can be made of another material having the desired moisture-barrier and low-friction protective properties, including but not limited to metal, glass, paper, aluminum, wood, plastic, fiberglass, composite, or another polymer such as polyethylene, polyurethane, polyvinyl chloride, or polypropylene.

In addition, the film material is durable and strong so that it does not lose its protective properties (e.g., by wearing through at the contact surfaces) over an extended period of use such as the typical lifetime of the floorboards 110 of the wood flooring system. For example, the film material preferably has a temperature variation resistance of about −20 C to about 70 C. For example, with some plastic materials, such as the OPP film, the moisture-blocking and low-friction properties typically will be the same after use for on the order of about 15 years to about 20 years (though high-quality flooring systems can last longer) after installation of the floorboards 110 as when the floorboards were first installed. This durability and strength increases the overall quality over an extended period of time of an installed solid-wood flooring system made of the floorboards 110 relative to a conventional solid-wood flooring system without the protective film system 130.

In typical embodiments such as those in which the protective film material is provided by the OPP film, the film sheet is sufficiently flexible that it can be easily deformed during application into a shape that conforms to the shape of the contact surfaces of the click system 112. Alternatively, the material can be substantially rigid and molded or otherwise pre-formed so the film sheet has a shape that conforms to the shape of the contact surfaces of the click system 112. Furthermore, the protective film can be plain or have a decorative decor printed or otherwise marked on it. For example, the film can include decorative graphics or a logo of the manufacturer.

In typical embodiments such as those in which the protective film material is provided by the OPP film, the film sheet has a thickness of preferably about 0.0003937 inch (0.01 mm) to about 0.7874 inch (20 mm), more preferably about 0.0003937 inch (0.01 mm) to about 0.01969 inch (0.5 mm), and most preferably about 0.001969 inch (0.05 mm) to about 0.003937 inch (0.1 mm). If the film is too thin and too flexible/flimsy, it can be difficult to handle and apply into proper positions on the contact surfaces of the click system 112. But if the film is too thick, the material cost is increased unnecessarily.

The film is adhered securely to the contact surfaces of the click system 112 by at least one adhesive and is applied with sufficient pressure to prevent the film and the floorboard 110 from delaminating or separating from each other during normal and intended use after installation. The adhesive can be applied to the click contact surfaces and/or the film as a separate step in the floorboard 110 manufacturing process. Alternatively, the film can be provided with an adhesive layer or coating on its inner/back side (that faces and adheres to the respective contact surface), with or without a removable backing that covers it prior to the film being adhered to the floorboard 110. Or the film can be manufactured of a material that exhibits adhesive properties upon exposure to an activating agent (e.g., water) and then dries (e.g., by heating or over time) secured in place.

The protective film system 130 of the depicted embodiment includes four separate film strips 132, 134, 136, and 138 (collectively, the film strips 130) that cover entirely all of the four mating click surfaces of the tongues 114 and 118 and the grooves 116 and 120 of the click system 112 of the floorboard 110. That is, the longitudinal tongue and groove film strips 132 and 134 extend horizontally along the entire lengths of the longitudinal tongues 114 and grooves 116, respectively (see FIGS. 7 and 10). And the longitudinal tongue and groove film strips 132 and 134 extend across the entire vertical thickness, while substantially conforming to the lateral profiles, of the longitudinal tongues 114 and grooves 116, respectively (see FIG. 11). In this way, all of both of the longitudinal click surfaces are entirely covered by the longitudinal tongue and groove film strips 132 and 134, with the result that humidity is substantially blocked from penetrating into the floorboard 110 through the longitudinal click surfaces. It will be understood that the longitudinal click surfaces (covered by the longitudinal tongue and groove film strips 132 and 134) are defined as the surfaces of the longitudinal tongues 114 and grooves 116 extending all the way between the top and bottom major faces 126 and 128 of the floorboard 110.

Figure 1:
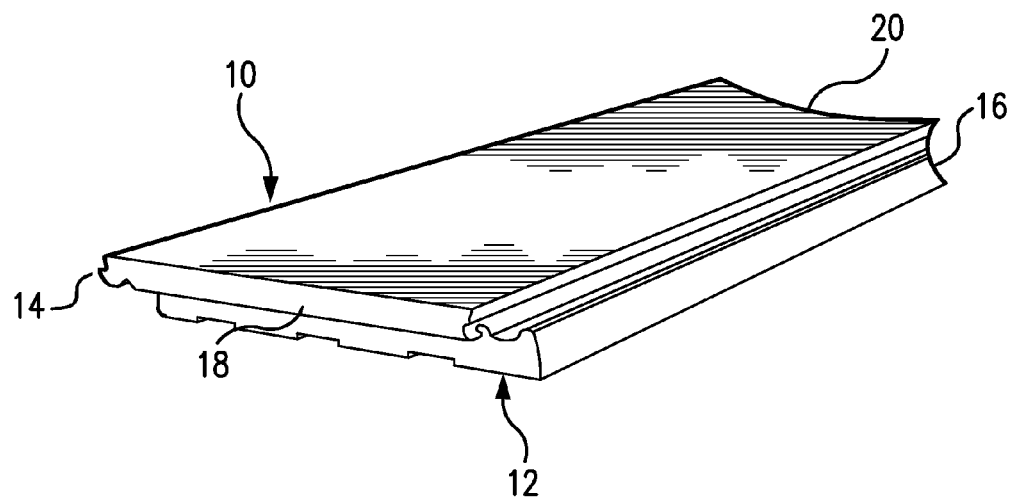
FIG. 1 is a top perspective view of a prior-art wood floorboard of a conventional wood flooring system with a conventional click-type interlocking joint system.
Figure 2:
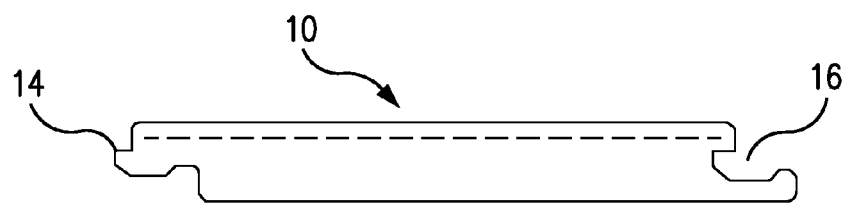
FIG. 2 is a lateral cross-section view (looking down the length) of the prior-art wood floorboard of FIG. 1.
Figure 3:
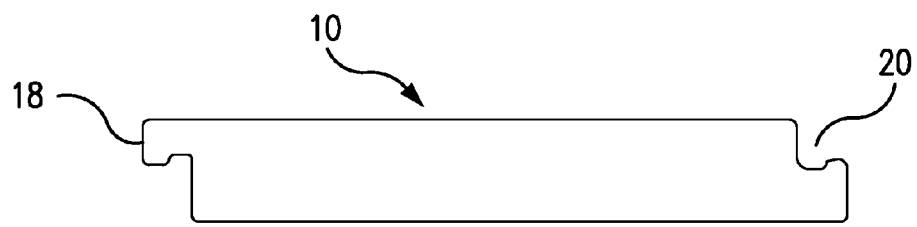
FIG. 3 is a longitudinal cross-section view (looking across the width) of the prior-art wood floorboard of FIG. 1.
Figure 7:
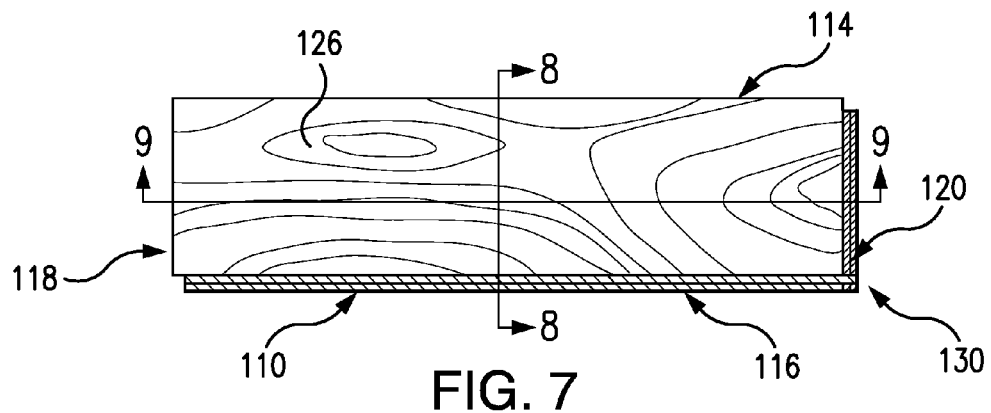
FIG. 7 is a top view of the floorboard of FIG. 6, showing the film system installed covering the click contact surfaces.
Figure 8:
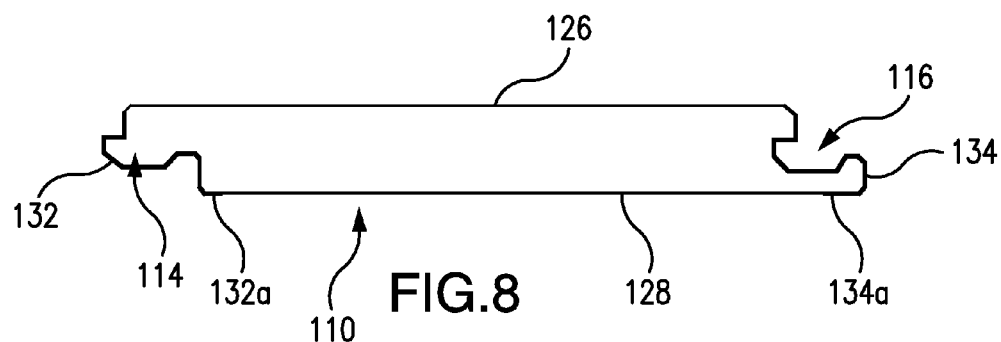
FIG. 8 is a lateral cross-section view of the floorboard of FIG. 6 taken at line 8-8.
Figure 9:
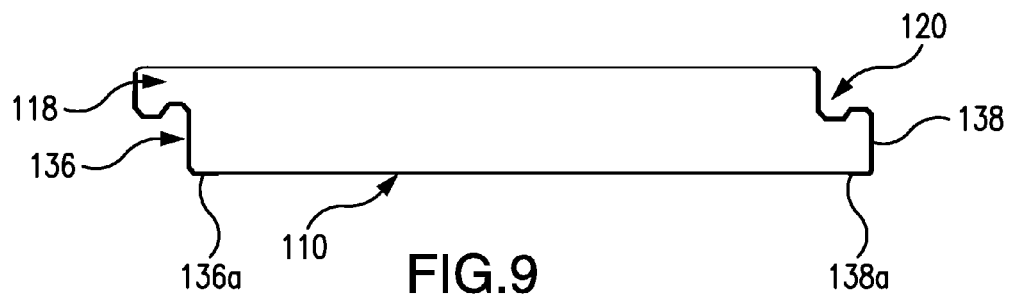
FIG. 9 is a longitudinal cross-section view of the floorboard of FIG. 6 taken at line 9-9.
Figure 10:
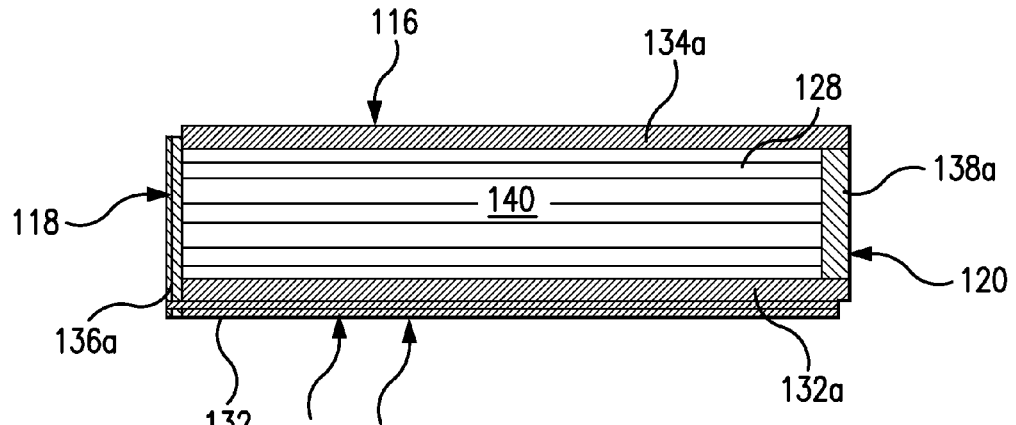
FIG. 10 is a bottom view of the floorboard of FIG. 6.

Similarly, the butt tongue and groove film strips 136 and 138 extend horizontally along the entire lengths of the butt tongues 118 and grooves 120, respectively (see FIGS. 7 and 10). And the butt tongue and groove film strips 136 and 138 extend across the entire vertical thickness, while substantially conforming to the lateral profiles, of the longitudinal tongues 118 and grooves 120, respectively (see FIGS. 8-9). In this way, all of both of the butt click surfaces 118 and 120 are entirely covered by the butt tongue and groove film strips 136 and 138, with the result that humidity is substantially blocked from penetrating into the floorboard 110 through the butt click surfaces. It will be understood that the butt click surfaces (covered by the butt tongue and groove film strips 136 and 138) are defined as the surfaces of the butt tongues 118 and grooves 120 extending all the way between the top and bottom major faces 126 and 128 of the floorboard 110.

In typical embodiments such as that depicted, the longitudinal film strips 132 and 134 each have portions 132a and 134a that overlap onto overlap portions of the bottom major face 128 of the floorboard 110, extend across the respective entire longitudinal click surfaces of the longitudinal tongue 114 and groove 116, and terminate at or immediately below the top major face 126 (see FIGS. 7-8 and 10-11). Similarly, the butt film strips 136 and 138 each have portions 136a and 138a that overlap onto overlap portions of the bottom major face 128 of the floorboard 110, extend across the respective entire butt click surfaces of the butt tongue 118 and groove 120, and terminate at or immediately below the top major face 126 (see FIGS. 7, 9-10, and 11A). In this way, the film strips 130 are not visible after installation of the floorboards 110, while they still cover their entire respective click surfaces. And with the film strips 130 overlapping onto the overlap portions of the bottom major face 128 of the floorboard 110, but not covering the entirety of the bottom major face, coverage of their entire respective click surfaces is ensured while minimizing film material quantity and thus cost. In alternative embodiments, the film strips 130 do not overlap onto the bottom major face 128 of the floorboard 110, and instead they terminate at or immediately above it.

For example, the two longitudinal film strips 132 and 134 can each overlap about 0.3937 (10 mm) onto the bottom (back) major face 128 so that collectively about 0.7874 inch (20 mm) of the width of the bottom major face 128 is covered by these two respective overlap portions 132a and 134a and the remaining (e.g., majority) portion 140 of the bottom face is left uncovered. Similarly, in some embodiments the two butt film strips 136 and 138 have respective overlap portions 136a and 138a that overlap a similar or smaller distance onto the bottom major face 128 (though this has less impact on the amount of film material used and exposed remaining portion 140 of the bottom major face).

The film strips 130 of this embodiment tend to be easy to apply to the click surfaces of the floorboard 110 and are particularly well-suited for some applications. For example, the film strips 130 of this embodiment are well-suited for gluing installation of the floorboards 110, as it leaves the significant uncovered portion 140 of the bottom major face 128 exposed for applying the glue to it. Even if the floorboards 110 are normally installed floating, it might still be desirable to glue or otherwise fasten them down in some places in some applications, for example, if the floorboards 110 are installed above an under-floor heating system. For such glued installations, the overlap portions of the film strips 130 preferably covers less than about 20% of the bottom major face 128 so that the about 80% or more remaining uncovered portion 140 is exposed for applying the glue to it.

In addition, the exposed remainder portion 140 of the bottom major face 128 of the floorboard 110 can be coated with one or more coats of a sealant to prevent moisture intrusion/escape through that surface to thereby increase the dimensional stability of the floorboard. Similarly, the top major face 126 of the floorboard 110 is typically coated with one or more coats of a finish including a sealant to prevent moisture intrusion/escape through that surface to thereby increase the dimensional stability of the floorboard. For example, the sealant can be provided by a clear coat of a non-toxic, ultraviolet-cured urethane finish.

In the depicted embodiment, the protective film strips 130 are each generally rectangular. In embodiments that are rectangular, the longitudinal-side film strips 132 and 134 each have a length of about 1.0 foot to about 8.0 feet (generally matching the linear length of the longitudinal tongues 114 and grooves 116) and a width of about ¾ inch to about 2.0 inches, in order to completely cover the contacting longitudinal tongue-and-groove click surfaces. And in such embodiments, the butt-side film strips 136 and 138 each have a length of about 2.0 inches to about 10.0 inches and a width of about ¾ inch to about 2.0 inches, in order to completely cover the contacting butt tongue-and-groove click surfaces.

In alternative embodiments, the film strips can be provided in other regular or irregular shapes and sizes such that they each or collectively substantially cover one or both facing contacting click surfaces, as may be suited for a given application. Thus, in some embodiments, for each pair of contacting tongue-and-groove click surfaces, only one of the surfaces is covered by a film strip, such that the film strips forms a single-layer barrier interposed between the two contacting surfaces. And in other embodiments, for each pair of contacting tongue-and-groove click surfaces, a first film-strip section covers a portion of a first one of the contact surfaces while a cooperating second film-strip section covers a portion of a second one of the contact surfaces such that the first and second film-strip sections cooperatively form a single-layer barrier between the first and second contact surfaces.

In the depicted embodiment, the entire click surfaces (the entire longitudinal and butt surfaces extending all the way between top and bottom major faces 126 and 128) are covered by the film strips 130. At a minimum, at least one of each of the facing contact surfaces of the click system 112 are covered by the film strips 130. In the depicted embodiment with a drop-lock click system 112, the longitudinal tongue and groove click surfaces 114 and 116 of two adjacent and abreast interlocked floorboards 110a and 110b have four pairs of facing contact surfaces of their click systems 112, with two pairs providing for horizontal interlocking and stability and with two pairs providing for vertical interlocking and stability.

As shown FIG. 11, for example, a conventional drop-lock click system includes a first pair 143 of facing contact surfaces for horizontal interlocking that includes the upper generally vertical surface 142 of the longitudinal tongue 114 and the facing upper generally vertical surface 144 of the longitudinal groove 116. A second pair 147 of facing contact surfaces for horizontal interlocking includes the angled rear surface 146 of the longitudinal tongue 114 and the facing angled front surface 148 of the longitudinal groove 116. In addition, a first pair 153 of facing contact surfaces for vertical interlocking includes the upper generally horizontal surface 152 of the longitudinal tongue 114 and the facing upper generally horizontal surface 154 of the longitudinal groove 116. A second pair 157 of facing contact surfaces for vertical interlocking includes the lower generally horizontal surface 156 of the longitudinal tongue 114 and the facing lower generally horizontal surface 158 of the longitudinal groove 116.

These four contact-surface pairs 143, 147, 153, 157 provide for a continuous transmission of force through the tongue-and-groove click joint to maintain the floorboards 110a and 110b in a secured and locked installed position relative to each other. The two contact-surface pairs 143 and 147 secure the floorboards 110a and 110b from horizontal movement, while the two contact-surface pairs 153 and 157 secure the floorboards from vertical movement, thereby collectively holding the floorboards together locked in place. But if the installed floorboards 110a and 110b are distorted from moisture variations, then when walking on them these four contact-surface pairs 143, 147, 153, 157 can each slide/rub together, resulting in squeaking of the floorboards absent the protective film system 130.

Because the two longitudinal film strips 132 and 134 cover the entire longitudinal click surfaces 114 and 116 of the click system 112, they necessarily cover the longitudinal contact surface pairs 143, 147, 153, and 157 of the longitudinal click surfaces. This film 130 coverage helps block humidity transfer (to reduce the distortion of the floorboard) and eliminates direct contact between any of two of the facing longitudinal wood contact click surfaces (so if the floorboards 110a and 110b slide against each other then no squeaking will be caused). In this way, solid-wood floorboards 110a and 110b with click systems 112 can be produced without risk of future squeaking and the associated customer complaints and replacement costs. And because the film 130 provides a complete moisture barrier on all four of the longitudinal and butt click surfaces, distortion of the solid-wood floorboards 110a and 110b is reduced, so the floorboards can be produced in wider sizes and still not squeak. As used herein, the term "entire" means "all or substantially all" such that the film strips 130 covering the entire click surfaces means they cover all or at least substantially all of them such that any frictional squeaking from rubbing at facing click surfaces is negligible and isolated relative to conventional click-type flooring systems.

Similarly, as shown in FIG. 11A, the butt-end tongue and groove click surfaces 118 and 120 of two adjacent and abutting interlocked floorboards 110a and 110b have three pairs of facing contact surfaces of their click systems 112, with two pairs 161 and 163 providing for horizontal interlocking and stability and with one pair 165 providing for vertical interlocking and stability. But these butt-end click surfaces 118 and 120 are typically rather small relative to the large longitudinal click surfaces 114 and 116, and they typically have tongue and groove profiles shaped to provide horizontal interlocking and stability but not necessarily vertical interlocking and stability. So in some embodiments the contact surfaces of the butt click surfaces are not covered by the protective film system 130, with only the contact surface pairs 143, 147, 153, 157 of the longitudinal click surfaces 114 and 116 covered by the film, or with only one contact surface of each longitudinal contact-surface pairs covered by the film.

FIGS. 12-13 show a solid-wood floorboard 210 of a solid-wood flooring system including a plurality of the floorboards according to a second example embodiment of the present invention. This embodiment is similar to the first embodiment in that each of the floorboards 210 has a click-type tongue-and-groove interlocking joint system 212 and a protective film system 230 for the click system. In this embodiment, however, the protective film 230 is made in one piece only and is sized so that it covers entirely the longitudinal tongue and groove click surfaces 214 and 216, the butt tongue and groove click surfaces 218 and 220, and the entire bottom (back) surface 128 of the floorboard 210. This prevents moisture intrusion/escape through the bottom surface 228 of the floorboard 210 to thereby increase the dimensional stability of the floorboard.

The single sheet of film 230 of this embodiment is typically made by cutting or punching the desired overall shape and size from a larger sheet of film, and the film sheet is then adhered onto the floorboard 210 so that it conforms to the profile of the click surfaces, with the film sheet adhered in place in such conforming shape by an epoxy layer that is integrally provided on the back side of the sheet or applied separately. Alternatively, the single sheet of film 230 of this embodiment can be made of several different pieces of film joined together by known methods such as by using gluing, other adherents, or other fastening techniques, or by placing them adjacent to but unsecured to each other.

In the floorboard 110 of the first embodiment there are four film strips 132, 134, 136, and 138 covering entirely the four click surfaces, and in the floorboard 210 of the second embodiment there is a single film sheet 230 covering entirely the four click surfaces. In other embodiments, the protective film system includes film covering only one, two, or three of the four click surfaces, only one or another number of the facing contact surface portions of such click surfaces, and/or only one contact surface of each facing contact surface pair, to help reduce moisture transfer and thus squeaking.

For example, FIGS. 14-17 show a solid-wood floorboard 310 of a solid-wood flooring system including a plurality of the floorboards according to a third example embodiment of the present invention. This embodiment is similar to the previously described embodiments in that each of the floorboards 310 has a click-type tongue-and-groove interlocking joint system 312 and a protective film system 330 for the click system. In this embodiment, however, the protective film 330 includes only the two longitudinal tongue and groove film strips 332 and 334 on the longitudinal tongue and groove click surfaces 314 and 316. Thus, the butt tongue and groove click surfaces 318 and 320 are not covered by the protective film system 330. But these butt click surfaces 318 and 320 are typically rather small relative to the large longitudinal click surfaces 314 and 316, and they typically have tongue and groove profiles shaped to provide horizontal interlocking and stability but not necessarily vertical interlocking and stability, so there is less risk of distortion of the floorboard 310 causing squeaking noises if these facing click surfaces rub against each other.

And FIGS. 18-21 show a solid-wood floorboard 410 of a solid-wood flooring system including a plurality of the floorboards according to a fourth example embodiment of the present invention. This embodiment is similar to the previously described embodiments in that each of the floorboards 410 has a click-type tongue-and-groove interlocking joint system 412 and a protective film system 430 for the click system. In this embodiment, however, the protective film 430 includes only the longitudinal groove film strip 434 on the longitudinal groove click surface 416 and the butt tongue film strip 436 on the butt tongue click surface 418. Thus, the longitudinal tongue click surface 414 and the butt groove click surface 420 are not covered by the protective film system 430. But there is still at least one sheet of the film 430 interposed between each of the contact surfaces of each facing click surface pair to help reduce moisture transfer and thus squeaking.

In other embodiments, the floorboard has the film strips on the longitudinal tongue click surface and/or longitudinal groove click surface only, and not on the butt tongue or groove click surface. In some embodiments there are four film sheets covering the entirety of all four click surfaces (as in the first embodiment), in others there is one film sheet covering the entirety of all four click surfaces (as in the second embodiment), in others there is film covering the entirety of only the two longitudinal click surfaces (as in the third embodiment), and in others there is film covering the entirety of only one of the longitudinal click surfaces and only one of the butt click surfaces (as in the fourth embodiment).

And in some embodiments there are film strips covering only one or more of the contact surfaces of one or more of the click surfaces (and thus not covering the entire sides/click systems). Thus, an alternative embodiment includes a floorboard with only two longitudinal film strips covering only the facing contact surfaces for horizontal interlocking. In one such embodiment the film system includes one or two film strips for one or both of the upper generally vertical surface of the longitudinal tongue and the facing upper generally vertical surface of the longitudinal groove (of an adjacent and abreast floorboard), and one or two film strips for one or both of the angled rear surface of the longitudinal tongue and the facing angled front surface of the longitudinal groove.

In another aspect of the invention, the protective film system is provided separately from the click-type floorboards. In such embodiments, a protective film system (according to any of the embodiments described herein and others) can be provided as an aftermarket product that is installed on the click-type floorboards by for example flooring dealers, flooring installers, homeowners, or others.

Having described details of several example embodiments of the protective-film click-type solid-wood system of floorboards, as well as the protective film system being provided as an aftermarket product, details of example methods and machines for applying the film to the floorboards will now be described.

Typically, the protective film is applied to the click surfaces at the end of the fabrication process of the wood floorboard. The wood floorboard fabrication process can be briefly described as follows. First, the wood raw materials are cut at a desired overall size and shape such that pairs of the four sides interlock and the two major faces are parallel. Second, the wood raw material is milled in order to create the interlocking tongue-and-groove joint system on the four interlocking sides of the floorboard. Third, the texture of the two (top and bottom) major faces of the floorboard is made. Fourth, a spray-on coating (e.g., including a finish and/or a sealant) is applied on the two major faces and dried. In some cases, the milling of the four sides/edges is done after the coating is applied in order to reduce the risk of height difference. And fifth, the protective film of the present invention is applied to one or more of the click surfaces. This is preferably done at the end of the wood floorboard fabrication process, no matter whatever else might have otherwise come last (so in some cases there is an intervening step). If the protective film is applied at a too early stage of the floorboard fabrication process, it might be damaged or create a support with low adhesion on one or both of the major faces of the floorboard, which can cause the coating to peel off the major faces. Application of the protective film on the sides/edges of the floorboards can be made using adhesives in conjunction with pressure so that the film and the floorboards do not delaminate or separate from each other.

Having described the overall floorboard fabrication process, details of an example of the protective-film application process (e.g., step five above) and machine will now be described. Referring to FIGS. 22-23, a first example film-application process and machine is suitable for applying a protective film 230 provided in a roll, with one side (the backing) covered by an adhesive, and for applying as a single sheet with a width for covering the longitudinal sides/edges 214 and 216 as well as the entire bottom major face 228 of the floorboard 210. Such film can be made of, for example, an orientated polypropylene (OPP) film with one side coated with an acrylic adhesive. For example, the film 230 of the second example embodiment of FIGS. 12-13 can be applied using this process.

As shown in FIG. 22, the protective film 230 can be applied to the floorboards 210 using a modified version of a conventional profile-wrapping machine 260 that is equipped with a film roll 262, one or more feed rollers 264, a row of pressure rollers 266 and 268 that position and press the film against the longitudinal sides/edges 214 and 216 of the floorboard 210, and a series of conveyor rollers 270 that are all rotated synchronously by a drive (e.g., one or more motors) to advance the film. The floorboards 210 enter the profile-wrapping machine 260 (in the direction indicated by the directional arrow) with the top major face 224 facing down, then the film 230 is unrolled from the film roll 262, and then the film is adhered onto the bottom (back) major surface 228 of the floorboard 210 by the pressure rollers 266 (full length not shown). In particular, as the film 230 and floorboard 210 are fed into the forming zone of the machine 260, the adhesive-covered back side of the film is brought into contact with the bottom (back) major surface 228 side of the floorboard 210 and pressure is applied by the pressure rollers 266. As shown in FIG. 23, with the floorboard 210 in the forming zone and the film 230 partially adhered (to only the bottom major face 228), then the film is formed around the longitudinal sides/edges 214 and 216 of the floorboard by the pressure rollers 268. After exiting the forming zone, the film 230 is cut by a knife 272 to its desired length. Click interlocking joint systems have complex shapes, so cutting the film 230, and/or pressuring all of it all the way onto all of the sides/click surfaces (e.g., including the butt film portions of the film sheet), can be done by hand or by automatic-machine technologies.

As mentioned above and shown more particularly in the serial step-by-step views of FIGS. 24-27, pressuring the film 230 onto the click surfaces of the longitudinal sides/ends of the floorboard 210 is done by the pressure rollers 268 after the protective film's adhesive-covered back side is pressed and adhered onto the bottom major face 228 of the floorboard. These serial step-by-step figures show the pressure rollers 268 being moved laterally along a portion of the click surface of the longitudinal groove 216 to apply a portion of the longitudinal film sheet 230 to it and to thus conform the shape of the film to that of the groove surface. In the remainder of the process (not depicted) the pressure rollers 268 continue being moved laterally along the remaining portion of the click surface of the longitudinal groove 216 to apply the remainder of the longitudinal film sheet 230 to it and to thus conform the shape of the film to that of the groove surface. In some alternative embodiments, the remainder of the longitudinal film sheet 230 is conformingly applied to the remaining portion of the click surface of the longitudinal groove 216 by hand (due to the complex profile of the groove surface). It should be noted that the width of the film sheet 230 is in practice typically greater than what is depicted such that the film covers the entire longitudinal side. The shape, size, and number of the pressure rollers 268 used can be selected based on the shape, size, and complexity of the longitudinal tongue and groove click surfaces.

In some embodiments, additional pressure rollers are provided for pressuring the film 230 onto the butt-end tongue and groove sides 218 and 220 of the floorboards 210. This can be done as a separate process using a separate machine with the butt-end pressure rollers, as part of the same process using the machine modified to further include the butt-end pressure rollers, or as a manual process by hand.

The floorboards 210 are preferably entered into the profile-wrapping machine 260 in a continuous flow. Thus, each floorboard 210 has a leading butt-end side that is in contact with the previous floorboard's trailing butt-end side, and in turn has a trailing butt-end side that is in contact with the leading butt-end side of the following floorboard. This method of continuous flow maximizes the throughput capacity of the machine 260 and improves its efficiency because the film 230 is always in tension.

If the film roll 260 position is not accurate, the forming-zone pressure rollers 266 are not properly adjusted, or the film is not stretched taunt enough, then the film might crease, bubble, and/or move out of position. As a consequence, a portion of the click surfaces of the longitudinal sides/edges 214 and 216 of the floorboard 210 might not get covered by the film 230. To avoid this, the film 230 is stretched taught at the entrance to the forming zone by the feed rollers 264 and within the forming zone by the continuous flow of the floorboards 210.

The position of the film roll 262 is selected based on the desired position of the film. The film roll 262 can be accurately positioned with a fixation system that prevents the film roll from moving out of place. In order to keep the adhesive on the film 230 (i.e., to keep the adhesive from sticking to the rollers and thereby coming off the film), the side of the film that comes into contact with the feed rollers 264 is the front surface (without the adhesive). The first pressure rollers 266 keep the film 230 in position and press it onto the bottom major face 228. The pressure of the pressure rollers 266 on the film 230 causes the acrylic adhesive to bond the film to the bottom face 228 of the floorboard 210. If the bonding of the film 230 to the bottom face 228 is not strong enough at this stage of the process, the film can move out of position during the remainder of the forming process. The bonding quality can be improved by increasing the pressure of the pressure rollers 266 on the film 230 or by increasing the amount of adhesive on the film.

Referring to FIG. 28, a second example film-application process and machine is suitable for applying a protective film 130 provided as two longitudinal film strips 132 and 134 with widths for covering the longitudinal sides/edges 114 and 116 of the floorboard 110 (as well as an overlap portion of the bottom major face 128 if desired), in one or two rolls, with one side (the backing) of each strip covered by an adhesive. Such film can be made of, for example, an orientated polypropylene (OPP) film with one side coated with an acrylic adhesive. For example, the film 130 of the second example embodiment of FIGS. 6-11 can be applied using this process and machine. It should be noted that the width of the film strips 132 and 134 are in practice typically greater than what is depicted such that the strip covers the entire longitudinal side.

This process and modified machine 160 are suitable for applications in which it is desired to keep the bottom major face 128 of the floorboard 110 from being completely covered and/or in applications in which is it desirable for only one longitudinal (or butt) side/edge of the floorboard to be covered. In the depicted example embodiment, the machine 160 includes two rows of pressure rollers 168 for pressing the two longitudinal film strips 132 and 134 into conforming coverage of the longitudinal click surfaces 114 and 116. The widths of the longitudinal film strips 132 and 134 are selected based in part on the desired width of the uncovered/exposed portion of the bottom major face 128 of the floorboard (the strips have widths selected to cover the longitudinal click surfaces plus any overlap portions of the bottom face).

It is understood that above-described processes are cost-efficient processes for applying the protective film to the click-type floorboards according to the present invention. Many alternative profile-wrapping processes and equipment designs can be used. For films that are not already covered with adhesive, some profile-wrapping machines and methods provide for applying the adhesive onto the film just before wrapping, typically along with some combination of heat and pressure to ensure the adhesive properly dries and bonds. But in general, such processes can be more complex and are not needed for the wrapping of the film of the present invention.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A flooring system, comprising:
   a plurality of tongue-and-groove floorboards having click systems that interlock the floorboards together to form the flooring system, wherein each of the floorboards comprises:
   a first longitudinal side defining a tongue, a second longitudinal side defining a groove, first and second butt sides, and first and second major faces, wherein the first and second longitudinal sides and the first and second butt sides extend all the way between the first and second major faces, wherein the first and second longitudinal sides at least partially define the click system, wherein the longitudinal tongue of each one of the floorboards has a shape that interlocks with the longitudinal groove of an adjacent and abreast one of the floorboards to secure the floorboards together in the flooring system, and wherein the longitudinal tongue and the longitudinal groove of the adjacent and abreast interlocked floorboards include at least one pair of facing contact surfaces that are in contact with each other; and at least one protective film strip covering both of or interposed between the pair of facing contact surfaces of the tongue-and-groove click system floorboards such that there is no direct contact between the pair of facing contact surfaces, wherein the film strip of each of the floorboards is made of a polymer material and includes an adhesive coating on a back side thereof, wherein the film strip has a moisture transmissivity defined by a moisture absorption rate of about 0.01 to about 1.5 such that the film strip substantially blocks moisture transfer through the film-strip-covered contact surfaces of the click system surfaces to reduce moisture-related distortion of the adjacent and abreast interlocked floorboards, and wherein the film strip has a coefficient of friction of about 0.01 to about 0.5 such that when the film-strip-covered contact surfaces of the adjacent and abreast interlocked floorboards slide against each other they are non-squeaking.

2. The flooring system of claim 1, wherein the floorboards are each made of a solid-wood construction, a laminate construction, or an engineered-wood construction.

3. The flooring system of claim 1, wherein the click system of each of the floorboards is a snap-lock system, a rotatable-lock system, or a drop-lock system, with or without separate locking elements.

4. The flooring system of claim 1, wherein the film strip of each of the floorboards is made of a material having a strength and durability defined by a temperature resistance of about −20 degrees C. to about 70 degrees C. such that the film strip retains the moisture transmissivity and the coefficient of friction over a useful lifetime of the floorboards of between about 15 and about 20 years, and wherein the polymer material that the film strip of each of the floorboards is made of is a flexible material such the film strip can be deformed during application into a shape conforming to that of the contact surfaces of the click system.

5. The flooring system of claim 1, wherein the film is made of orientated polypropylene.

6. The flooring system of claim 5, wherein the orientated polypropylene film is substantially transparent, and wherein the adhesive coating on the back side of the orientated polypropylene film is made of an acrylic material.

7. The flooring system of claim 1, wherein the film strip of each of the floorboards has a thickness of about 0.0003937 inch to about 0.7874 inch, about 0.0003937 inch to about 0.01969 inch, or about 0.001969 inch to about 0.003937 inch.

8. The flooring system of claim 1, wherein the film strip of each of the floorboards covers both of or is interposed between the respective entire click system defining the pair of facing contact surfaces, wherein the film strip covers the entire longitudinal side defining the tongue, the entire longitudinal side defining the groove, or both.

9. The flooring system of claim 8, wherein the at least one film strip of each of the floorboards comprises two film strips that cover the entire longitudinal side defining the tongue and the entire longitudinal side defining the groove, but that leave uncovered at least a portion of the second major face.

10. The flooring system of claim 8, wherein the film strip of each of the floorboards comprises two film strips that each terminate at or immediately below the first major face, extend over and cover the entire longitudinal side defining the tongue and the entire longitudinal side defining the groove, and extend over and cover overlap portions of the second major face, but that leave uncovered a remainder portion of the second major face between the overlap portions.

11. The flooring system of claim 10, wherein the film strips are each generally rectangular and overlap onto the second major face about 0.3937 inches.

12. The flooring system of claim 10, wherein the film strips are each generally rectangular and have a width of about ¾ inch to about 2.0 inches.

13. The flooring system of claim 8, wherein the at least one film of each of the floorboards comprises a single film strip that covers the entire longitudinal side defining the tongue, the entire longitudinal side defining the groove, and the entire second major face.

14. The flooring system of claim 1, wherein the click system comprises a first pair of facing contact surfaces for horizontal interlocking including an upper generally vertical surface of the longitudinal tongue and a facing upper generally vertical surface of the longitudinal groove of the adjacent and abreast floorboards, a second pair of facing contact surfaces for horizontal interlocking including an angled rear surface of the longitudinal tongue and a facing angled front surface of the longitudinal groove of the adjacent and abreast floorboards, a first pair of facing contact surfaces for vertical interlocking including an upper generally horizontal surface of the longitudinal tongue and a facing upper generally horizontal surface of the longitudinal groove of the adjacent and abreast floorboards, and a second pair of facing contact surfaces for vertical interlocking including a lower generally horizontal surface of the longitudinal tongue and a facing lower generally horizontal surface of the longitudinal groove of the adjacent and abreast floorboards, wherein the film strip covers both of or is interposed between at least the first and second pair of facing contact surfaces for horizontal interlocking and the first and second pair of facing contact surfaces for vertical interlocking.

15. The flooring system of claim 1, wherein the first and second butt sides of each of the floorboards define tongues and grooves, respectively, and wherein the at least one film strip of each of the floorboards covers the entire butt side defining the tongue, the entire butt side defining the groove, or both.

16. The flooring system of claim 1, wherein each of the floorboards has a width that is greater than about 10.0 inches.

17. A method of constructing a flooring system, comprising:
providing the flooring system of claim 1;
providing pressure rollers; and
manipulating the pressure rollers to adhere the film onto one or more of the contact surfaces of the click system of one of the floorboards.

18. A flooring system, comprising:
a plurality of tongue-and-groove floorboards having click systems that interlock the floorboards together to form the flooring system, wherein each of the floorboards comprises:
a first longitudinal side defining a tongue, a second longitudinal side defining a groove, first and second butt sides, and first and second major faces, wherein the first and second longitudinal sides and the first and second butt sides extend all the way between the first and second major faces, wherein the first and second longitudinal sides at least partially define the click system, wherein the longitudinal tongue of each one of the floorboards has a shape that interlocks with the longitudinal groove of an adjacent and abreast one of the floorboards to secure the floorboards together in the flooring system, and wherein the longitudinal tongue and the longitudinal groove have at least one pair of facing contact surfaces that are in contact with each other when the adjacent and abreast floorboards are interlocked together, wherein the floorboards are each made of a solid-wood construction, a laminate construction, or an engineered-wood construction, wherein the click system is a snap-lock system, rotatable-lock system, or drop-lock system, with or without separate locking elements; and at least one protective film strip covering both of or interposed between the pair of facing contact surfaces of the tongue-and-groove click-system such that there is no direct contact between the pair of facing contact surfaces, wherein the film strip has a moisture transmissivity defined by a moisture absorption rate of about 0.01 to about 1.5 such that the film strip substantially blocks moisture transfer through the film-strip-covered contact surfaces of the click system surfaces to reduce moisture-related distortion of the adjacent and abreast interlocked floorboards, wherein the film strip has a coefficient of friction of about 0.01 to about 0.5 such that when the film-strip-covered contact surfaces of the adjacent and abreast interlocked floorboards slide against each other they are non-squeaking, wherein the film strip is made of a material having a strength and durability defined by a temperature resistance of about −20 degrees C. to about 70 degrees C. such that the film strip retains the moisture transmissivity and the coefficient of friction over a useful lifetime of the floorboards of between about 15 and about 20 years, wherein the film strip is made of a flexible material such that the film strip can be deformed during application into a shape conforming to that of the contact surfaces of the click system, wherein the flexible material that the film strip is made of is a polymer material and includes an adhesive coating on a back side thereof, wherein the film strip has a thickness of about 0.0003937 inch to about 0.7874 inch, wherein the film strip is generally rectangular, wherein the film strip covers the respective entire click system defining the pair of facing contact surfaces, wherein the film strip covers the entire longitudinal side defining the tongue, the entire longitudinal side defining the groove, or both.

19. A flooring system, comprising:

a plurality of tongue-and-groove floorboards having click systems that interlock the floorboards together to form the flooring system, wherein each of the floorboards comprises:

a first longitudinal side defining a tongue, a second longitudinal side defining a groove, first and second butt sides, and first and second major faces, wherein the first and second longitudinal sides and the first and second butt sides extend all the way between the first and second major faces, wherein the first and second longitudinal sides at least partially define the click system, wherein the longitudinal tongue of each one of the floorboards has a shape that interlocks with the longitudinal groove of an adjacent and abreast one of the floorboards to secure the floorboards together in the flooring system, and wherein the longitudinal tongue and the longitudinal groove of the adjacent and abreast interlocked floorboards include at least one pair of facing contact surfaces that are in contact with each other; and at least one protective film strip covering both of or interposed between the pair of facing contact surfaces of the tongue-and-groove click-system floorboards such that there is no direct contact between the pair of facing contact surfaces, wherein the film strip of each of the floorboards is made of a polymer material and includes an adhesive coating on a back side thereof, wherein in use the film strip functions to substantially block moisture transfer through the film-covered contact surfaces of the click system surfaces to reduce moisture-related distortion of the adjacent and abreast interlocked floorboards, and wherein in use the film strip functions to permit the film-covered contact surfaces of the adjacent and abreast interlocked floorboards to slide against each other without squeaking.

* * * * *